Figure 1:
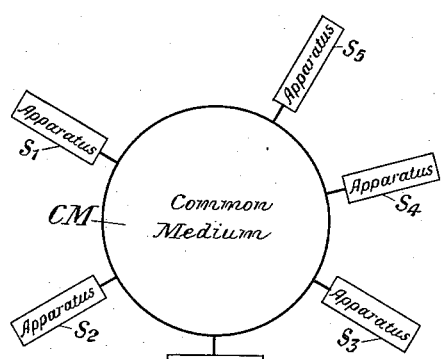

Dec. 22, 1936.   L. ESPENSCHIED ET AL   2,064,896
COMMON MEDIUM MULTICHANNEL EXCHANGE SYSTEM
Filed May 26, 1934   8 Sheets-Sheet 1

INVENTORS
L. Espenschied
BY E. I. Green
ATTORNEY

Dec. 22, 1936.  L. ESPENSCHIED ET AL  2,064,896
COMMON MEDIUM MULTICHANNEL EXCHANGE SYSTEM
Filed May 26, 1934   8 Sheets-Sheet 2

INVENTORS
L. Espenschied and
BY E. I. Green
ATTORNEY

Dec. 22, 1936.　　　L. ESPENSCHIED ET AL　　　2,064,896
COMMON MEDIUM MULTICHANNEL EXCHANGE SYSTEM
Filed May 26, 1934　　　8 Sheets-Sheet 3
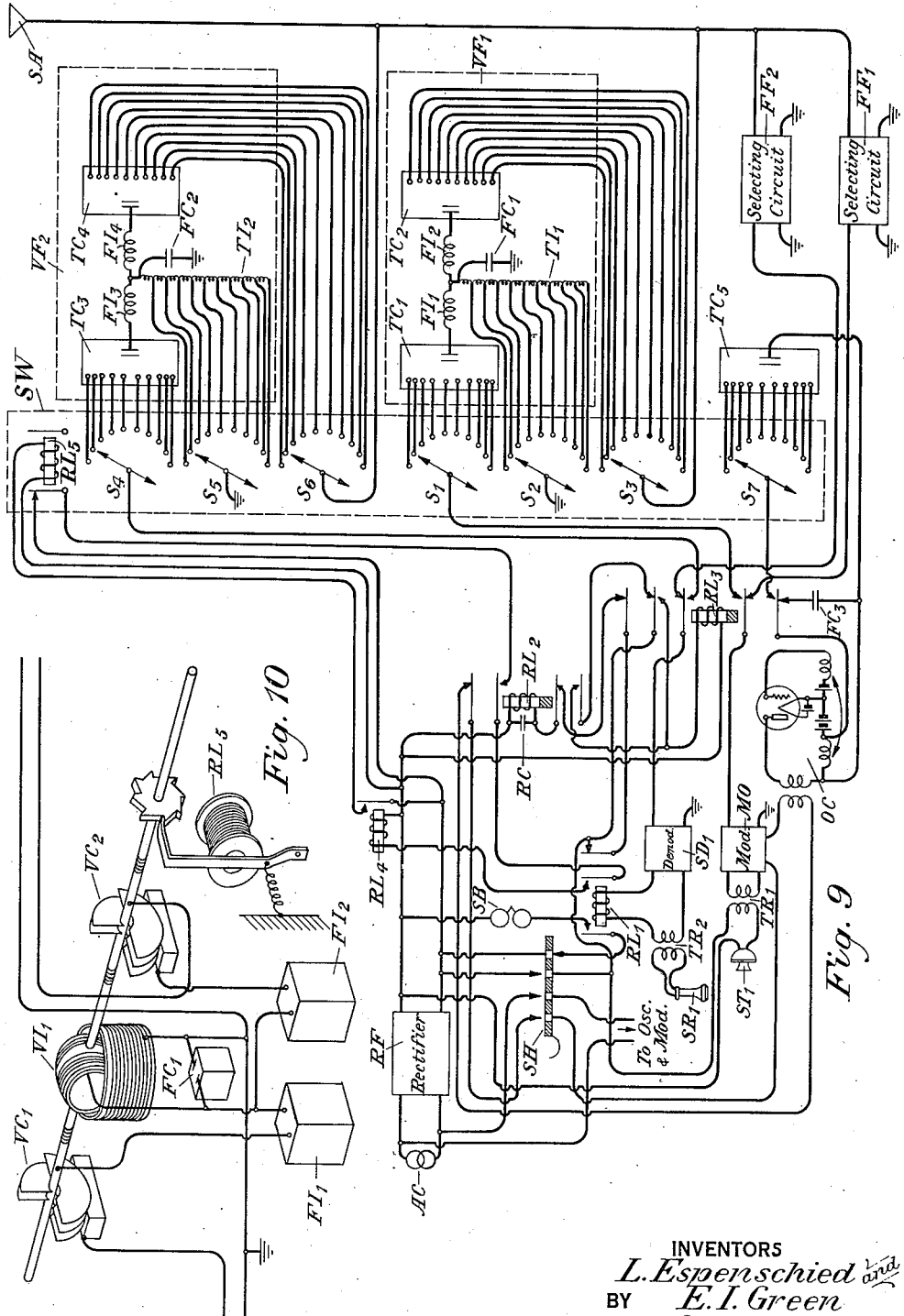
INVENTORS
L. Espenschied and
BY　E. I. Green
ATTORNEY

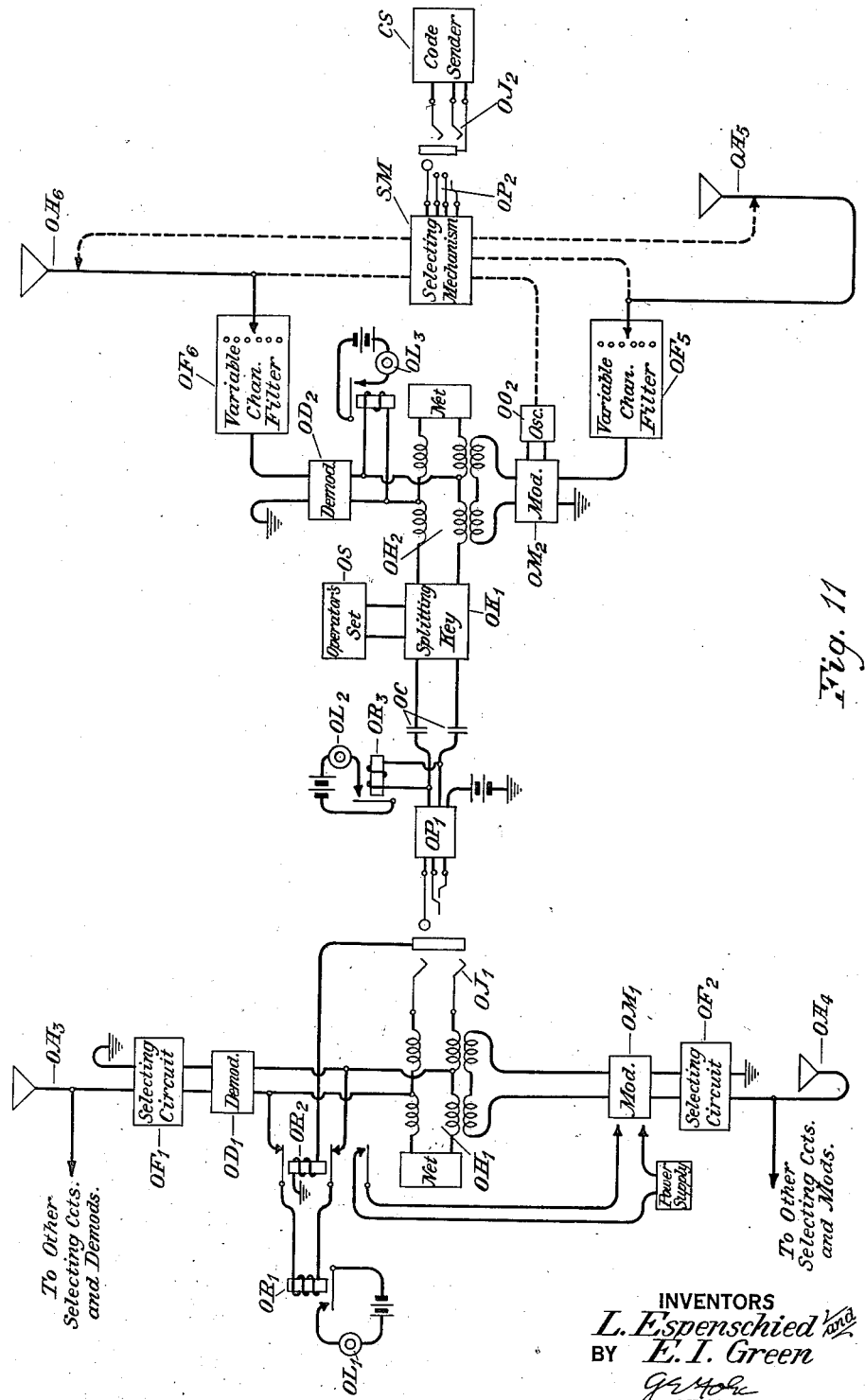

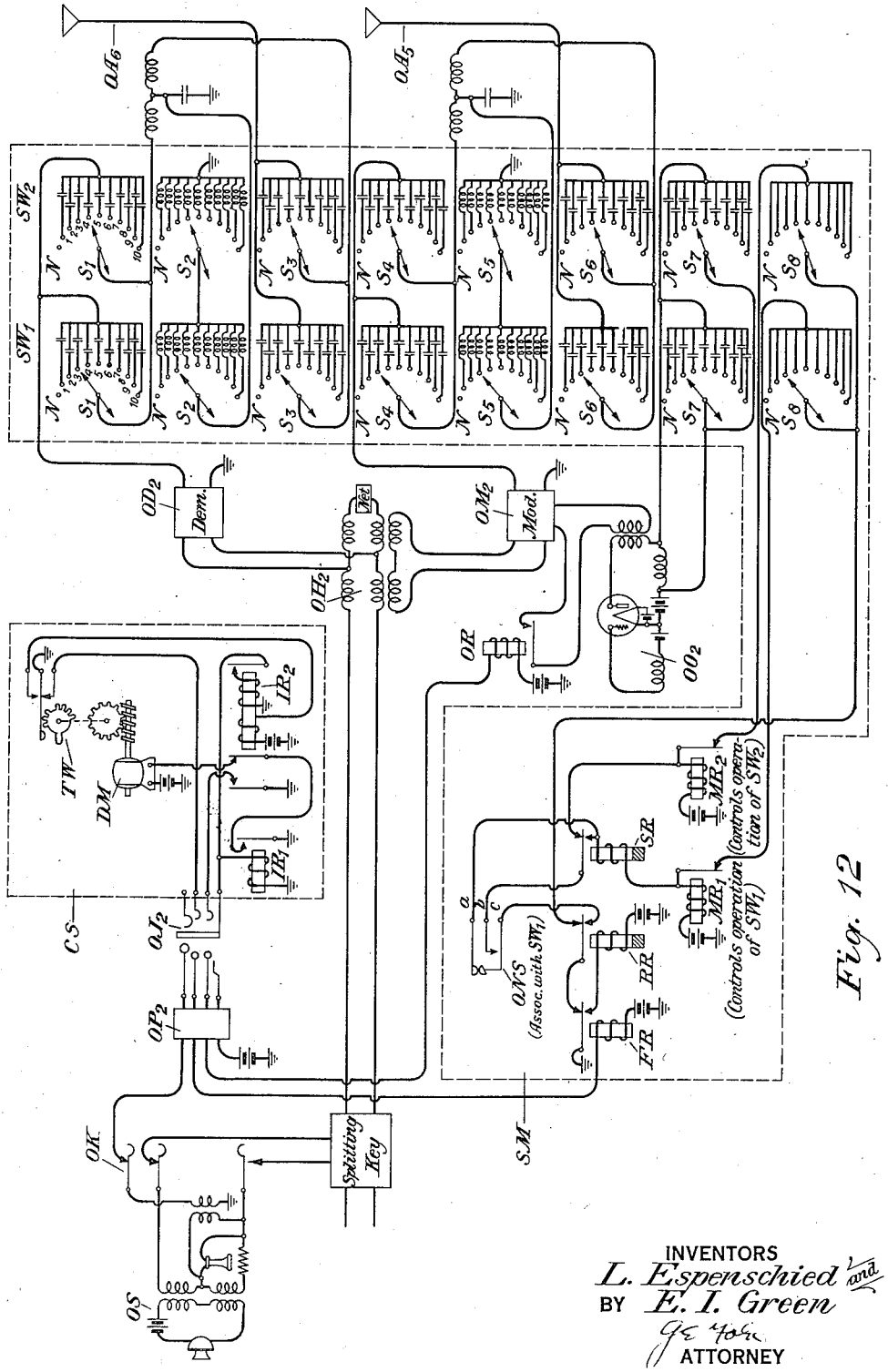

Dec. 22, 1936.  L. ESPENSCHIED ET AL  2,064,896
COMMON MEDIUM MULTICHANNEL EXCHANGE SYSTEM
Filed May 26, 1934  8 Sheets-Sheet 7

INVENTORS
L. Espenschied and
BY  E. I. Green
ATTORNEY

INVENTORS
L. Espenschied and
BY E. I. Green
ATTORNEY

Patented Dec. 22, 1936

2,064,896

UNITED STATES PATENT OFFICE 2,064,896

COMMON MEDIUM MULTICHANNEL EXCHANGE SYSTEM

Lloyd Espenschied, Kew Gardens, N. Y., and Estill I. Green, East Orange, N. J., assignors to American Telephone and Telegraph Company, a corporation of New York Application May 26, 1934, Serial No. 727,811

15 Claims. (Cl. 250—6)

This invention has for its object the provision of an exchange system in which communication between subscribers is carried out over channels of different frequency derived from a common guiding medium. More particularly, the invention is designed to utilize as a substitute for the many subscriber pairs which are employed in the ordinary telephone exchange system the many channels which are obtainable in the high-frequency art as it is now unfolding and to provide means whereby these channels may be selected by subscribers at will and employed for interconnection.

In the telephone exchange systems which have heretofore been provided it has been the practice to group subscribers in central office areas. Each subscriber is connected to his own central office by means of an individual wire circuit or by a party line arranged for non-simultaneous use by a few subscribers. When a subscriber desires to call another subscriber he utilizes his own line to the central office, and upon passing the desired number either to an operator or to an automatic switching mechanism is connected to another line which extends either directly or via another office or offices to the called party. For a system of this kind many thousands of subscriber circuits are necessary in each central office area. These are commonly provided in the form of a network of multiple pair cables extending over the area.

In accordance with the present invention it is proposed to substitute for such individual wire circuits extending to each subscriber a transmission medium which is common to all subscribers and which will accommodate a range of frequencies sufficiently wide for a large number of telephone channels. Interconnection between subscribers is then carried out over these high-frequency channels.

The essence of the invention resides in making available to a large number of subscribers a transmission medium capable of accommodating a wide range of frequencies so that the subscribers may utilize, for the purposes of intercommunication, a plurality of signaling channels derived from the wide-band medium. A transmission medium capable of handling the large number of channels required for the exchange system of the invention may be obtained by utilizing either radio transmission in space or high-frequency transmission over a conducting or guiding medium.

This type of system is not known to have been heretofore invented, apparently because the necessary wide-frequency spectrum which is required has not been available to the art either by radio or wire methods. A conception of the band width which is required may be had by assuming that there is taken as a unit a local exchange system of 1000 subscribers and that each subscriber is allotted an individual channel of 10,000 cycles, making a total band width of some 10,000,000 cycles. Any such band width as this has not been available in the art until very recently.

In the case of radio, until the recent opening up of the ultra-high-frequency (ultra-short-wave) range, the art has not permitted the invention to be realized, for three reasons: First, there was not sufficient space in the frequency range, which until recently did not go beyond about 30 mc., to accommodate this type of service along with all the other demands upon the radio spectrum; second, the characteristics of the waves vary widely through this spectrum (up to 30 megacycles), so that it is difficult to obtain a wide band having sufficiently uniform characteristics for the purpose; third, the waves in this range do not cut off very sharply with distance, and as a result their interfering effects extend to great distances, in many cases thousands of miles, making it impossible to operate a local service in one area without giving rise to interference in distant areas. With the opening of the ultra-high-frequency range, frequencies above 30 mc. (wavelengths below about 10 meters), an entirely new prospect is presented, making it for the first time physically possible to set up by radio the system comprising the invention. Of course, this is not saying that the system will either prove to be desirable or economical for actual operation. This will not be known until a great deal of development work is done and the general art is much further advanced.

It will be appreciated also that the invention has not been feasible heretofore as a wire proposition because it has not been possible until very recently to transmit over wire circuits for considerable distances frequency bands greater than some tens of thousands, or, at most, hundreds of thousands of cycles. The transmission of bands of some millions of cycles as required by the invention has become possible by wire methods only recently through the development of radically new types of wire systems, as exemplified by the coaxial conductor type of line, as described in U. S. Patent No. 1,835,031, to L. Espenschied and H. A. Affel. These new wire systems are characterized by the provision of means for quite completely shielding the transmission path from outside disturbances. This is done in the coaxial circuit by the outer conductor which serves both as a shield and one of the line conductors. By virtue of the skin effect at these very high frequencies, the desired transmission is confined to the inner surface of the tube and interference originating from without is confined to the outer surface. Thus, the shielded type of circuit permits of blocking off a wide frequency band for the purposes of the invention and subjecting the transmitting medium to full control in respect to the exclusion of interference, the prevention of overhearing on the part of outsiders and the general knitting together of the system as a self-contained unit. In other words, in this wire embodiment of the invention there are retained the advantages of wire transmission, plus the advantage of radio in respect to the availability of a wide frequency spectrum.

In general, these recent developments, whereby the frequency range of radio and of wire transmission is being greatly extended, are the basis of the present invention. The extension of the frequency range is so great as to amount to the imparting to the art of a new dimension of development, the frequency dimension, whereby it becomes possible to derive large numbers of telephone channels and to handle them as a group. Thus, there is obtained on a frequency basis large numbers of identical channels comparable to the large number of physical circuits which are obtained in the local telephone plant in the familiar telephone cables.

Considering, first, the use of radio as the medium for transmitting the wide band of frequencies contemplated by the invention, the invention is designed to employ whatever part of the frequency range may be available. Heretofore, however, the radio frequency spectrum has scarcely afforded sufficient frequency space to yield the channel capacity required for a local telephone exchange system. With the opening up of the field of ultra-short waves this limitation as to channel capacity is removed. Thus, for example, between one and two meters there is a total frequency range of 150 megacycles while the range between 10 and 20 centimeters is 1500 megacycles. The frequency ranges obtainable through the use of still shorter waves are much greater.

With these ultra-high frequencies, however, nature imposes another limitation, i. e., the tendency of the waves to take on quasi-optical characteristics, so that they project only in straight lines and do not bend around corners to any considerable extent. Thus, it becomes necessary that subscribers utilizing such waves have a fairly clear line of sight between their antennas. Some diffraction around obstacles may, of course, be obtained, but, in general, reasonably clear line-of-sight projection without intervening obstacles appears to be called for. This, of course, has the advantage of making it possible to utilize the same ultra-high frequencies in different areas.

The line-of-sight characteristics of the ultra-short waves must be recognized in the design of a telephone exchange system utilizing this technique. In one form of the invention it is proposed to provide in the center of a community a central station with antennas mounted sufficiently high above the surrounding buildings to make possible the necessary directness of transmission between these antennas and practically any point in the territory to be served. One subscriber's station is then placed in connection with another by transmitting first to the central station and through the central station to the desired other subscriber located in another part of the community. The central station besides serving as a switching point acts as a means for catching the waves from the subscribers at a relatively high point, thus keeping the transmission path above any obstacles lying between the subscribers' antennas.

In order that such a central station may be economical, it is proposed to make it capable of handling simultaneously a wide band of frequencies such as would accommodate hundreds or perhaps thousands of channels. The particular arrangement of the central station will be hereinafter described.

As an alternative to the use of a radio transmission medium, the invention contemplates the employment of a guiding or conducting transmission path suitable for the required band of frequencies. Such a transmission path would be provided in the form of a network, extending to all the subscribers within a given area. Conceivably, such a network might be composed of ordinary wire circuits branched and interconnected so as to make the common circuit available to each subscriber. Thus, the wire network might be somewhat similar to the network employed for distributing light and power currents, except that a simple two-wire network without multi-phase connections, voltage transformation arrangements, etc., would suffice. It would, however, be possible to carry out the invention by employing the light and power network itself and this is contemplated within the scope of the invention.

The preferred form of guiding transmission medium, however, is one which is designed for the transmission of a wide band of frequencies with comparatively low attenuation and preferably also with shielding to minimize the effect of external disturbances. Such a transmission medium may be found in a circuit consisting of two conductors disposed coaxially with respect to one another. In a properly designed coaxial circuit, as will be hereinafter explained, low attenuation at high frequencies may be attained by the employment of conductors of suitably low high-frequency resistance and the use of a substantially gaseous dielectric between the conductors. With this type of circuit the outer conductor serves also as a shield whose protective effect becomes more nearly perfect as the frequency is increased, so that at high frequencies practically complete immunity from external disturbances may be obtained.

The invention contemplates also as an alternative to the coaxial circuit a high-frequency transmission medium comprising a circuit consisting of two conductors surrounded by a shield. Here, again, the high-frequency attenuation may be minimized by proper design with substantially gaseous insulation and the thickness of shield may be determined so as to minimize interference from external disturbances.

Yet another form of transmission medium suitable for carrying out the invention is a dielectric wave guide comprising a cylindriform dielectric material which may or may not be surrounded by a conductor. An advantageous form of such a transmission path is a hollow cylindrical conductor containing air or some other gas as the dielectric. This type of circuit is particularly adapted to transmit waves of very high frequencies, for example, of the order of a few centimeters or less in wavelength.

Using any of the above types of transmission media, the interconnection of subscribers at will from the available channels involves a number of new and difficult problems which are solved by the various features of the invention as hereinafter disclosed.

One of the big functions involved in local exchange telephone systems is that of switching so that each subscriber may be connected with any other subscriber. This operation is now carried out at the central offices by the switching of mechanical contacts either as a manual operation or by automatic equipment under remote control of the subscriber. Actually, a great many of these contacts are involved and there is a considerable hazard in poor contacts giving rise to microphonic noises in subscribers' lines. Also, the making and breaking of contacts gives rise to surges of currents in these lines due to the presence of direct current with consequent noises and clicks.

In accordance with certain embodiments of the invention, it is proposed to carry out this function of interconnecting subscribers without the switching of mechanical contacts. This is accomplished by having the subscribers permanently connected to the common medium and completing the electrical path either directly by the subscriber at his own premises or at a central office by frequency selection. Thus, an important object of the invention is the provision of means whereby mechanical switching may be replaced by "electrical switching."

In general, the invention contemplates the assignment to each subscriber of a particular frequency or frequencies which might preferably be related to his telephone number. The assignment of frequencies should be such as to facilitate the interconnection of subscribers and various schemes of frequency allocation are provided in the invention for this purpose.

Figure 3:
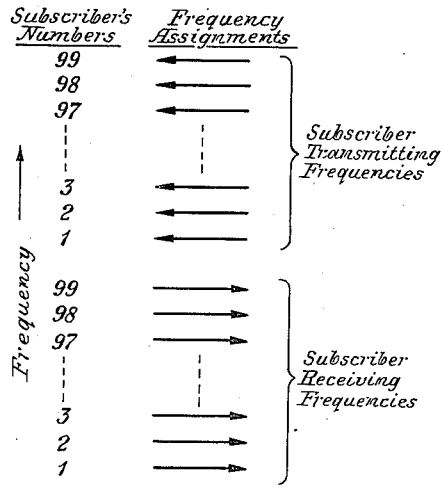
Figure 2:
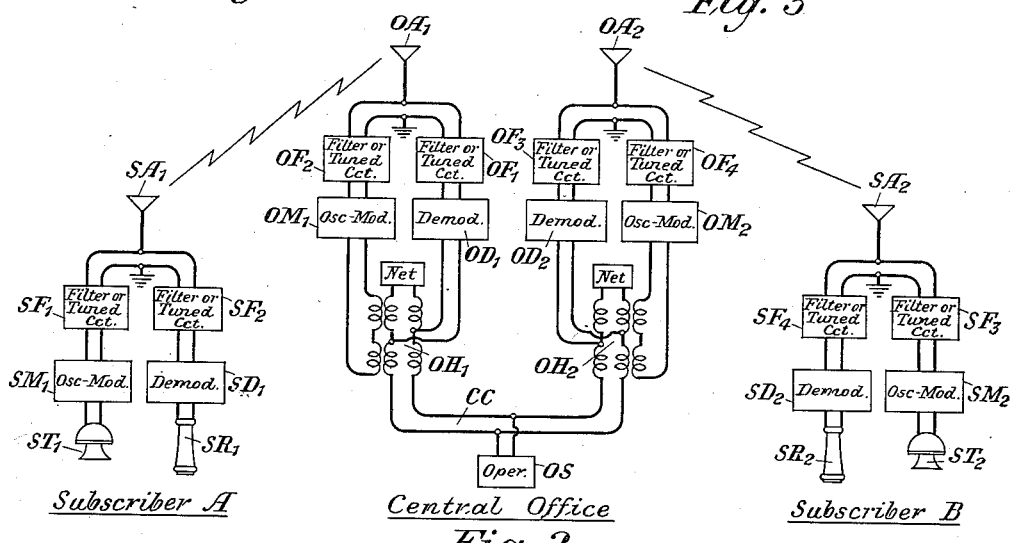
Figure 4:
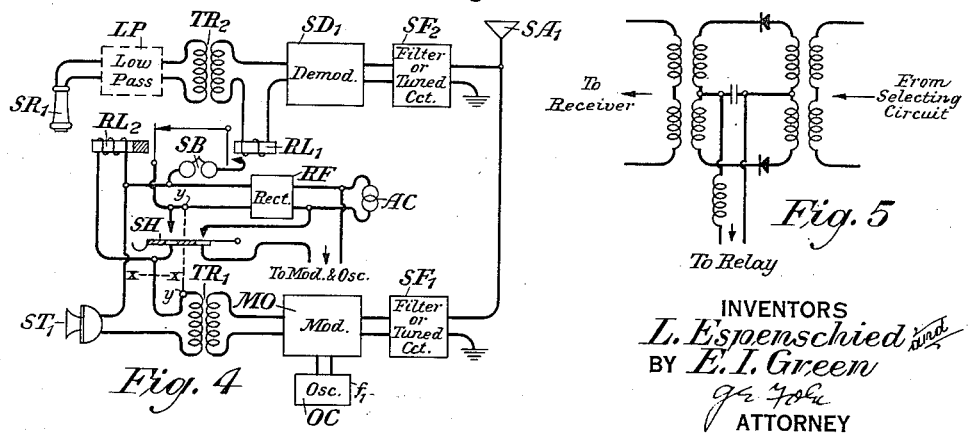
Figure 5:
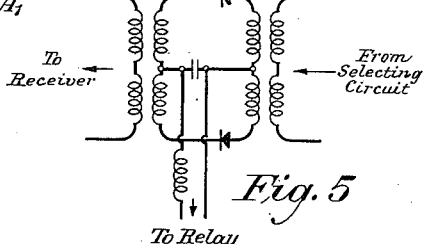
Figure 6:
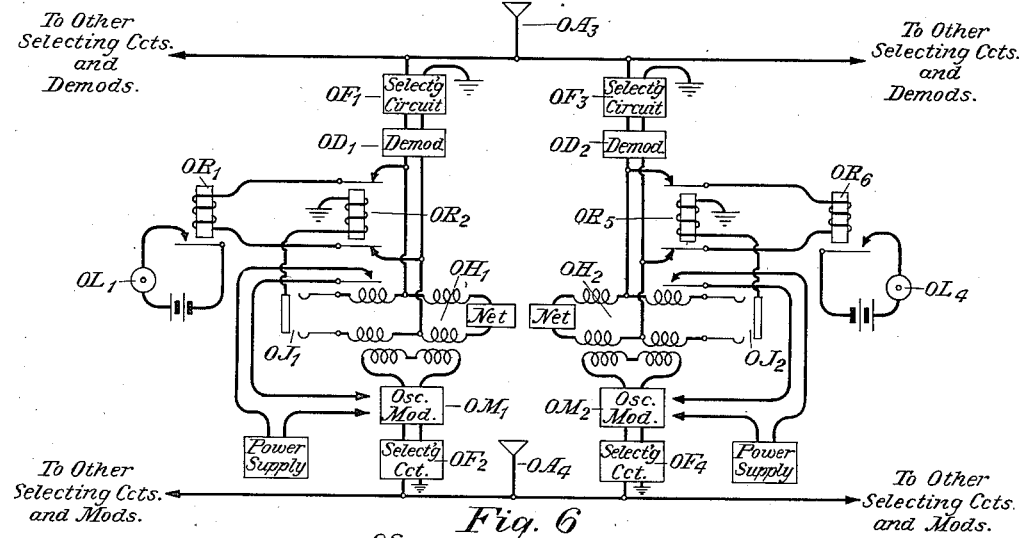
Figure 7:
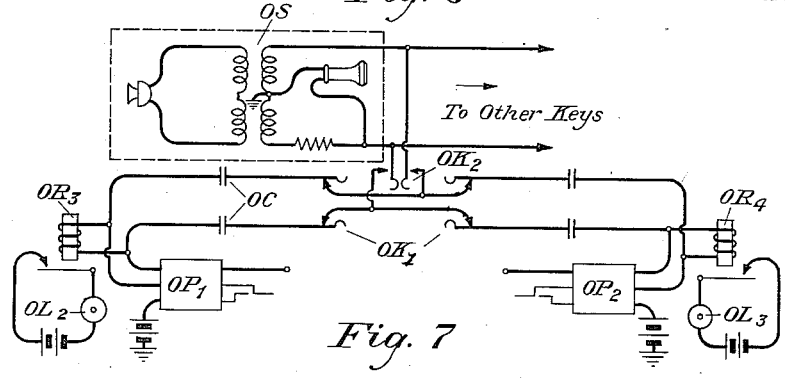
Figure 8:
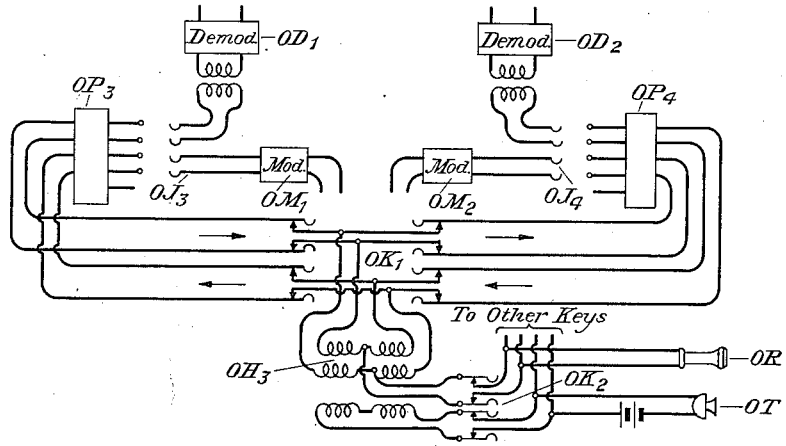
Figure 13:
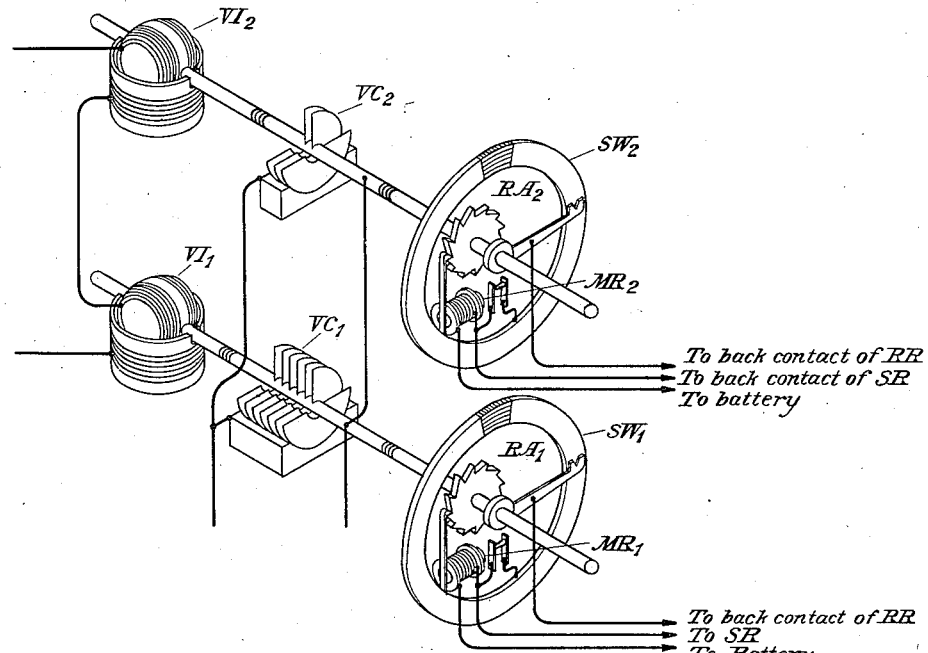
Figure 14:
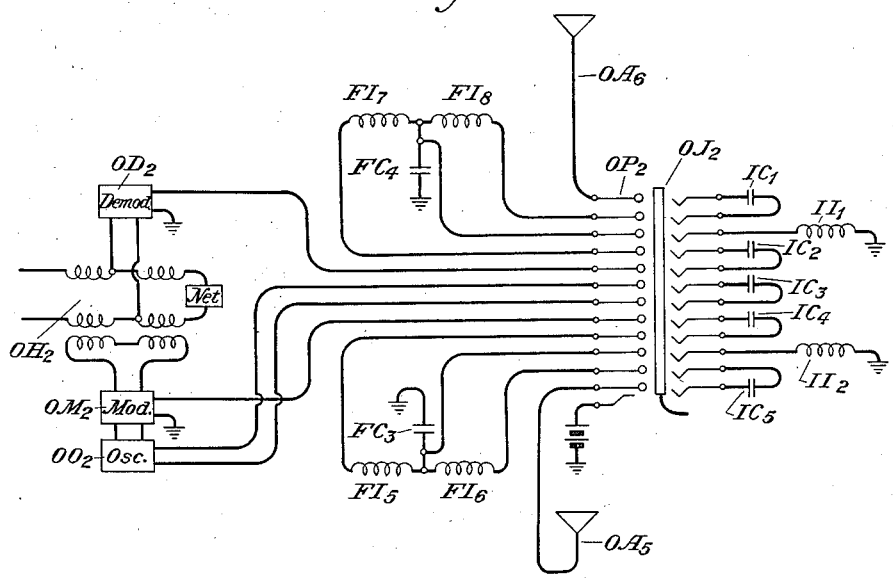
Figure 15:
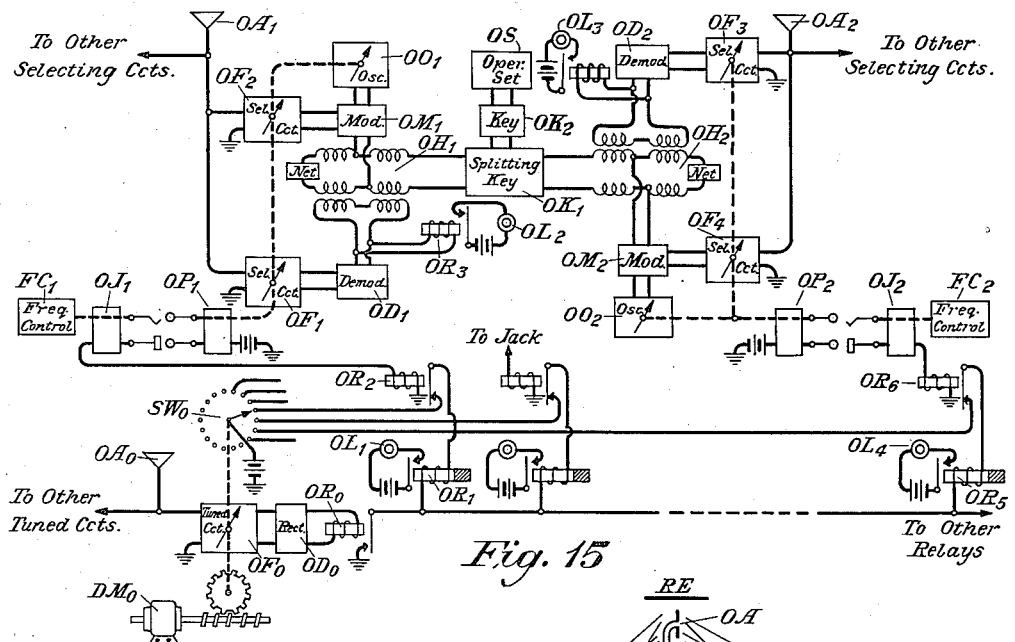
Figure 16:
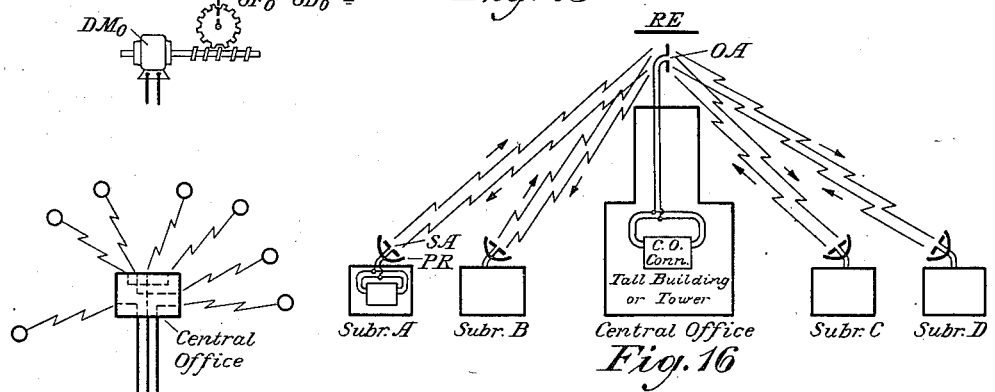
Figure 17:
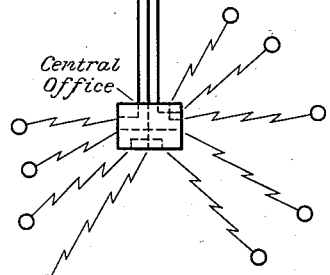
Figure 18:
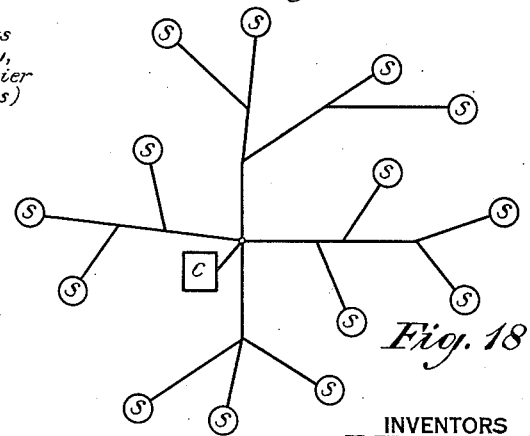
Figure 19:
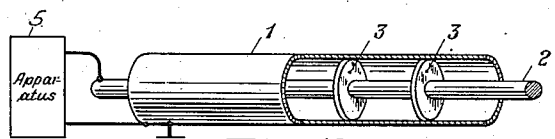
Figure 20:
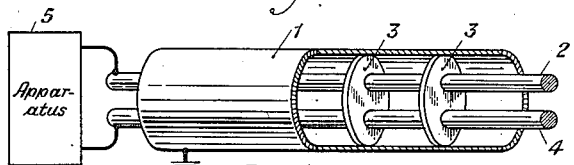
Figure 21:
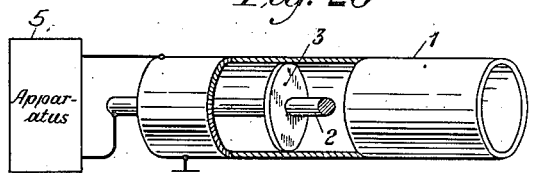
Figure 22:
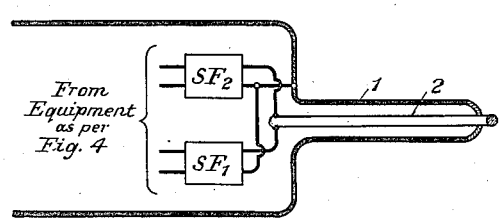
Figure 24:
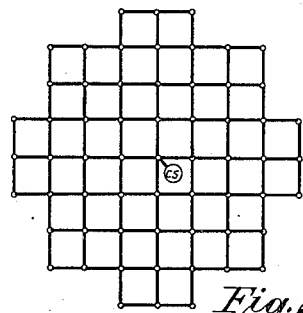
Figure 25:
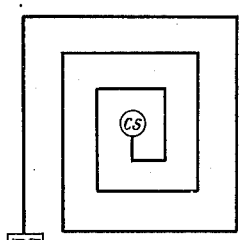
Figure 26:
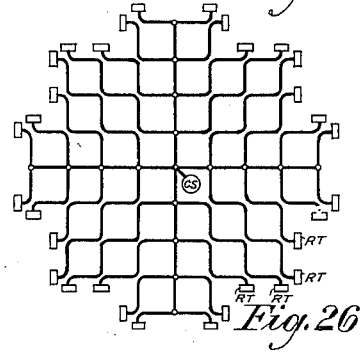
Figure 23:
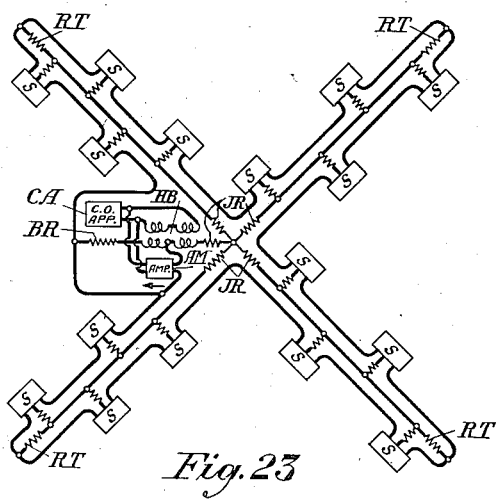
Figure 27:
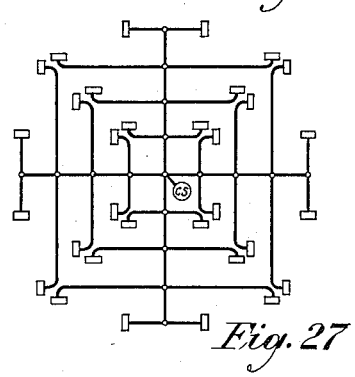

The foregoing outline having indicated some of the principles of the invention as well as a few of its major objects, the complete invention with its various details, features and purposes will now be understood from the following description when read in connection with the accompanying drawings, in which Figure 1 shows a schematic representation of the principal idea of the invention wherein a large number of stations are connected to a common transmission medium; Fig. 2 shows in schematic form a system for connecting subscribers through a central office using space radio transmission; Fig. 3 shows one possible allocation of frequencies for a multichannel exchange system; Fig. 4 shows a subscriber station arrangement which may be used in the system of Fig. 2; Fig. 5 shows a modulating device which may be used in various applications of the invention; Figs. 6 and 7 in combination show a central office arrangement which may be used in association with the subscriber station arrangement of Fig. 4; Fig. 8 shows a cord circuit arrangement alternative to that of Fig. 7; Fig. 9 shows another subscriber station arrangement for the system of Fig. 2; Fig. 10 shows a method of channel selection alternative to that employed in Fig. 9; Fig. 11 shows a central office arrangement which may be used in association with the subscriber station arrangement of Fig. 9; Fig. 12 shows a frequency adjusting mechanism which may be used in the arrangement of Fig. 11; Fig. 13 shows a method of channel selection which may be used in place of that of Fig. 12; Fig. 14 shows yet another channel selecting arrangement which may be used in connection with Fig. 11; Fig. 15 shows another central office arrangement which may be used in association with the subscriber station arrangement of Fig. 4; Fig. 16 shows an antenna arrangement for use in a system in which subscribers are interconnected at a central office; Fig. 17 is a schematic diagram indicating how connections may be established between subscribers in the same area, and between subscribers in different areas through central offices over trunk circuits; Fig. 18 is a schematic diagram of a guiding or conducting network which is available in common to a central station and a number of subscribers; Figs. 19, 20, and 21 show different forms of transmission paths which may be used to form a transmission medium common to a number of subscribers; Fig. 22 shows how the subscriber station arrangement of Fig. 4 might be adapted to a coaxial circuit network; Fig. 23 shows an arrangement in which a number of subscriber stations may communicate with one another through a central station over a common transmission network; Fig. 24 shows one scheme for making a common transmission network available to a number of subscribers; Figs. 25, 26, and 27 show network arrangements alternative to that of Fig. 24.

Referring to Fig. 1, there is illustrated one of the principal aspects of the invention. In this figure is shown a common medium CM, to which are connected a plurality of stations $S_1$, $S_2$, $S_3$, etc., each of which includes transmitting, receiving and associated apparatus. This apparatus, which will be hereinafter described, is arranged to permit intercommunication between different pairs of stations over the common medium CM employing different frequency bands to permit simultaneous communication between different pairs of stations. Connection between any pair of stations as, for example, $S_1$ and $S_3$, may take place through the common central station CS.

Fig. 2 shows in schematic form a telephone exchange system in which a number of subscribers may be interconnected through a central office, the connection between each subscriber and the central office being accomplished by radio transmission through space. Each subscriber is provided with transmitting apparatus including an oscillator-modulator and receiving apparatus including a demodulator, together with the necessary selecting circuits. At the central office a plurality of circuits, such as the one shown, is provided for interconnecting between subscribers. Each connecting circuit includes two separate sets of apparatus, each of which comprises a radio transmitter and receiver, and a connection, to which the operator has access, between the two sets of apparatus.

Transmission from subscriber A to subscriber B is effected by means of the transmitter $ST_1$, the oscillator-modulator $SM_1$, the tuned circuit or filter $SF_1$, the antenna $SA_1$, the antenna $OA_1$, the tuned circuit or filter $OF_1$, the demodulator $OD_1$, the hybrid coil $OH_1$, the connecting circuit CC (across which is bridged the operator's set OS), the hybrid coil $OH_2$, the oscillator-modulator $OM_2$, the tuned circuit or filter $OF_4$, the antenna $OA_2$, the antenna $SA_2$, the tuned circuit or filter $SF_4$, the demodulator $SD_2$ and the receiver $SR_2$. Transmission in the opposite direction is accomplished in an analogous manner, employing the transmitter ST₂, the oscillator-modulator SM₂, the selecting circuit SF₃, the antenna SA₂, the antenna OA₂, the selecting circuit OF₃, the demodulator OD₂, the hybrid coil OH₂, the connecting circuit CC, the hybrid coil OH₁, the oscillator-modulator OM₁, the selecting circuit OF₂, the antenna OA₁, the antenna SA₁, the selecting circuit SF₂, the demodulator SD₁ and the receiver SR₁.

It is proposed that different frequencies be employed for the oppositely directed transmissions in Fig. 2 and that the frequencies employed between the calling subscriber and the central office be different from those used between the central office and the called subscriber. Transmission might be on either a double or a single sideband basis with the carrier frequency transmitted.

In order that simultaneous conversations may take place between a number of pairs of subscribers, it is necessary that the frequencies employed in the system of Fig. 2 be properly selected. One way of arranging the frequencies would be to assign to each subscriber a separate pair of frequencies, one for transmitting and one for receiving, and to provide apparatus at the central office for receiving and transmitting the various required frequencies. Thus, subscriber A might be assigned a transmitting frequency $f_1$ and a receiving frequency $f_2$, and subscriber B transmitting and receiving frequencies $f_3$ and $f_4$, respectively. This would mean that in Fig. 2 the modulators SM₁ and SM₂ would operate with carrier frequencies $f_1$ and $f_3$, respectively, and the modulators OM₁ and OM₂ with carrier frequencies $f_2$ and $f_4$, respectively.

With such a scheme it might prove desirable, in order to facilitate the allocation of frequencies and the interconnecting of subscribers, to have a constant difference between the transmitting and receiving frequencies of each subscriber, or, in other words, to make $$f_1-f_2=f_3-f_4=D \qquad (1)$$

The frequencies $f_1$, $f_3$, etc., might then be grouped in one part of the frequency spectrum and the frequencies $f_2$, $f_4$, etc., in another part. A diagram of a frequency allocation of this sort, assuming a total of 99 subscribers, is given in Fig. 3. It will be noted that the order of the frequency assignments corresponds to that of the subscriber numbers. This scheme, while not essential to all embodiments of the invention, is a very desirable feature in many.

Detailed arrangements of apparatus which might be used at the subscriber's station and at the central office in a scheme of this sort are illustrated in Figs. 4 and 6. While some of the apparatus shown in these and succeeding figures is more particularly adapted to radio frequencies lying below the ultra short-wave range, it will be understood that such apparatus is shown merely to illustrate the principles of the invention, and is not intended in any way to limit its scope.

The operation of the subscriber's apparatus illustrated in Fig. 4 is as follows: When the subscriber desires to make a call, the receiver SR₁ is removed from the switchhook SH. Through the contacts of the switchhook this closes a circuit which furnishes power supply to operate the oscillator and modulator OC and MO. The operation of the switchhook also provides D. C. supply for the transmitter ST₁, this supply being derived through a rectifier RF which is connected to the A. C. supply. The speech currents produced in the transmitter, after passing through the transformer TR₁, are modulated upon the assigned frequency, here assumed to be $f_1$. The oscillator and modulator may be separate units of any desired types, or a self-oscillating modulator might be used. The carrier and sidebands in the modulator output, after passing through the selecting circuit SF₁, are radiated by the antenna SA₁ to the central office. When communication with the central office is established in a manner hereinafter to be described, the number of the called subscriber is passed orally to the operator and after the proper arrangements are set up at the central office, communication is established with the called subscriber who is provided with apparatus identical with that of Fig. 4 except for the frequency assignments used.

In the case of an incoming call, the carrier frequency $f_2$ and its associated sidebands are received by the antenna SA₁, selected by the selecting circuit SF₂ and demodulated by the demodulator SD₁. This demodulator may be of the vacuum tube type, in which case it should be kept always in operating condition so that a call may be received. Preferably, however, the demodulator might comprise some passive element or elements, as, for example, copper-oxide units as shown in Fig. 5. Associated with the demodulator is a relay RL₁, which is operated by the rectified current resulting from the incoming carrier frequency and which in turn operates the call bell SB. When the subscriber answers the call, the switchhook SH is operated, which, in addition to completing the contacts previously mentioned, operates the slow-release relay RL₂, which breaks the circuit of the bell SB. The received voice-frequency currents, after passing through the transformer TR₂ are applied to the receiver SR₁ and two-way communication is thus established. If desired, a low-pass filter LP (shown dotted in Fig. 4) may be included in the receiver circuit to suppress unwanted high-frequency components in the demodulator output. It will be understood that a similar filter may be provided in the arrangements hereinafter described. When the subscriber hangs up, the slow-release feature of RL₂ prevents his bell from ringing before the other party also hangs up.

It will be appreciated in connection with Fig. 4 and subsequent figures that other known methods of modulation and demodulation may be employed. Particularly, direct modulation and demodulation whereby the modulation process takes place in the electro-acoustical device itself are contemplated within the scope of the invention. An example of this method of modulation using a carbon transmitter may be found in Chapter VIII, Figure 1 of "Principles of Radio Communication," by J. H. Morecroft. A condenser transmitter may be similarly employed as a modulator.

It will be noted that the filters SF₁ and SF₂ in Fig. 4 are arranged to select a fixed frequency. Consequently, with the exception of one switchhook contact there will be no switched contacts in the transmission path of the subscriber's apparatus of Fig. 4. The switchhook contact may be readily avoided by replacing the connection through the switchhook by a permanent connection to the rectifier RF as shown by the dotted line $y$—$y$. In this case the connection at the point $x$—$x$ should be broken.

Figs. 6 and 7 illustrate central office apparatus which may be used in conjunction with the subscriber's apparatus shown in Fig. 4. In the arrangement of Fig. 6 a number of selecting circuits $OF_1$, $OF_3$, etc. corresponding to the transmitted frequencies of the different subscribers are connected to a common antenna $OA_3$. The total number of such selecting circuits is equal to the total number of subscribers to be served in the area. Similarly, selecting circuits $OF_2$, $OF_4$, etc., which correspond to the receiving frequencies assigned to the various subscribers are connected to the antenna $OA_4$. If desired, the two antennas might be replaced by a single antenna, or the transmitting and receiving apparatus might be grouped in other ways for connection to antennas.

The operation of the apparatus in Figs. 6 and 7 is as follows: The incoming carrier frequency of a calling subscriber is received on the antenna $OA_3$, selected by one of the selecting circuits, for example, $OF_1$, and demodulated by the demodulator $OD_1$. Associated with the demodulator is a relay $OR_1$ whose winding is connected to the demodulator output through the contacts of another relay $OR_2$. The rectified current resulting from the incoming carrier frequency operates the line relay $OR_1$, which in turn lights the line lamp $OL_1$, thereby calling the attention of the operator to the incoming call.

The operator is provided with a number of cord circuits of the type shown in Fig. 7, each cord circuit terminating in plugs, such as $OP_1$ and $OP_2$. Upon observing the line lamp she inserts the plug $OP_1$ associated with one of the cord circuits into the jack $OJ_1$ of the calling subscriber. Thus the voice-frequency currents delivered by the demodulator, after passing through the hybrid coil $OH_1$, reach the operator's set $OS$. The sleeve connection of the plug operates the relay $OR_2$ which extinguishes the line lamp $OL_1$, and connects power supply to the oscillator-modulator $OM_1$. The insertion of the plug operates the supervisory relay $OR_3$, which lights the supervisory lamp $OL_2$. This lamp remains lit as long as the calling subscriber has his receiver off the hook. The condensers $OC$ in the cord circuit serve to interrupt the D. C. path, so that line and supervisory relays and lamps may be similarly operated at the other side of the connection.

To the conjugate terminals of the hybrid coil $OH_1$ there are connected the oscillator-modulator $OM_1$ and the selecting circuit $OF_2$ so that the operator may answer the incoming call. The subscriber then passes the number of the called party to the operator. A "busy test" of the called subscriber's line is obtained through the tip of the plug at the other end of the cord circuit and the sleeve of the subscriber's jack. In case another cord circuit is already connected to a jack corresponding to the number of the called party, the sleeve of the jack will have battery connected to it and a click will be produced in the operator's receiver.

If the called subscriber's "line" is not busy, the operator places the plug $OP_2$ in a jack, such as $OJ_2$ of Fig. 6, of the called party, thereby completing the connection. The operation of the relay $OR_5$ connects power supply to the oscillator-modulator $OM_2$, so that the carrier is transmitted and the bell of the called party rings. When the called party answers, the supervisory lamp $OL_3$ is lighted by means of relay $OR_4$ and remains lighted until the called party hangs up. The conversation then proceeds with the apparatus functioning in a manner similar to that described in connection with Fig. 2. When the conversation is completed, the lamps $OL_2$ and $OL_3$ are extinguished as the subscribers hang up, and the operator takes down the connection. By means of keys, such as $OK_2$, the operator may connect her set to different cord circuits, and using the key $OK_1$ she may split the connection and talk to either subscriber without the other.

It will be noted that the cord circuit connection between the two subscribers in Fig. 7 is arranged on a two-wire basis. If desired, this connection might be made instead on a four-wire basis, using for example, the arrangement shown in Fig. 8. In this case the plugs $OP_3$ and $OP_4$ each establish four contacts in addition to that of the sleeve, and the jacks $OJ_3$ and $OJ_4$ are substituted for the jack and hybrid coil combination of Fig. 6. The oppositely directed paths of the connection are brought through the splitting key $OK_1$. The operator may talk to either or both subscribers by means of the key $OK_1$ and the hybrid coil $OH_3$ which is connected through the key $OK_2$ to the operator's transmitter and receiver $OT$ and $OR$. The connections of the line and supervisory lamps and relays and other minor details are not shown in Fig. 8, it being understood that their operation will be generally similar to that described in Figs. 6 and 7.

It will be understood in connection with the arrangements of Figs. 6, 7, and 8, and the other central office connecting arrangements subsequently described, that any desired amount of amplification of the signals may be included in the central office connection.

The total number of frequencies or channels required for the scheme just described is evidently equal to twice the number of subscribers. The scheme is therefore somewhat wasteful of central office apparatus inasmuch as it requires a separate modulator, demodulator and selecting circuits for each pair of subscribers' frequencies.

In order to reduce the amount of apparatus required at the central office, various alternative methods of frequency alocation might be used in place of the one just described. In accordance with one such method, one pair of frequencies would be assigned to each subscriber for incoming calls. In addition, a number of pairs of frequencies equal to the maximum number of conversations that might be desired at any one time would be set aside for use by calling subscribers in reaching the central office. In placing a call, the subscriber would select, either manually or automatically, an idle pair of frequencies over which to establish connection to the central office. He would then pass the number of the called party to the operator, who would complete the connection to a jack corresponding to the number of the called party, and this operation would adjust the frequencies of the other half of the cord circuit to those of the called subscriber. Details of apparatus which might be used at the subscriber's station and the central office for carrying out this method are shown in Figs. 9, 10, 11, 12, 13, and 14.

The operation of the arrangement shown in Fig. 9 is as follows: When the subscriber desires to make a call, he removes the receiver $SR_1$ from the switchhook $SH$. The operation of the switchhook provides d. c. supply for the transmitter $ST_1$ and power supply for the oscillator and modulator $OC$ and $MO$ in the manner already described. In addition, the operation of the switchhook energizes the slow-release relay $RL_2$ whose winding is connected to the d. c. supply through one of its own back contacts and back contacts of the relays $RL_3$ and $RL_1$. (At the time the switchhook is removed the relay $RL_1$ in the demodulator circuit is deenergized, since the demodulator is connected through one of the back contacts of the relay $RL_3$, which is also deenergized, to the fixed selecting circuit $FF_2$ which is used for incoming calls.) Relay $RL_2$ is a slow-release relay which remains pulled up during the entire selecting operation. The condenser RC which is bridged across the winding of $RL_2$ contributes toward the slow-release feature.

The operation of the relay $RL_2$ energizes the slow-release relay $RL_3$, which is connected through the make contact of $RL_2$, one of its own break contacts and the switchhook. The relay $RL_3$ in operating establishes for itself a new path direct through one of its own make contacts and the switchhook, so that this relay remains in operation until the receiver is replaced on the hook at the conclusion of the call.

The operation of the relay $RL_3$ serves to connect the modulator MO and the demodulator $SD_1$ through the selective switching apparatus SW to the variable selecting circuits $VF_1$ and $VF_2$, which in turn are connected to the antenna $SA_1$.

Before continuing with the description of the circuit operation, the selective switching apparatus SW will be described. This apparatus is of a type well known in automatic switching practice. It comprises in effect a rotary switching unit having seven adjacent rows or banks of contacts, $s_1$, $s_2$, etc., each row having ten contacts arranged in the form of a semi-circle, so that wipers may be operated step-by-step by the stepping magnet $RL_5$ to engage the various contacts in succession. A double-ended wiper is provided for each row of contacts so that switching takes place always in a forward direction. The different banks of contacts are all arranged to be operated from the same stepping magnet.

Each of the variable filters $VF_1$ and $VF_2$ comprises a T network which includes in each series arm a tapped condenser, such as $TC_1$, and a fixed inductance, such as $FI_1$. The shunt portion of each filter comprises in parallel a fixed condenser, such as $FC_1$, and a tapped inductance, such as $TI_1$. The tapped condensers $TC_1$ and $TC_2$ and the tapped inductance $TI_1$ are connected respectively to the banks of contacts $s_1$, $s_3$, and $s_2$ so that when the wipers of these banks are in any given position, the filter is adjusted to select a particular high-frequency channel (passing both the carrier and its sidebands). The proportioning of the tapped condensers and inductance is such that the filter $VF_1$ is able to select any one of ten channels assigned for transmitting from the calling subscriber to the central office, while the filter $VF_2$ is able to select any one of ten channels assigned for transmitting from the central office to the calling subscriber. It will be understood that the showing of ten pairs of channels for establishing connection with the central office is purely arbitrary and that any other desired number might be provided instead, the total number being such as to accommodate the maximum number of conversations expected to take place simultaneously.

While it would be possible for the subscriber to select an idle pair of channels by manual adjustment, it is considered preferable to prform this selection automatically, and the switching apparatus SW, in combination with the variable filters $VF_1$ and $VF_2$, accomplishes this result. The method by which this selection is carried out will now be explained. If, when the relay $RL_3$ operates, the switching apparatus SW is connected to an idle pair of channels, the wipers of the switching unit remain in position, and the channel is used by the subscriber for obtaining his connection through the central office in a manner hereinafter to be described. If, however, at the time the relay $RL_3$ is operated, the switches are connected to a pair of channels already in use, a carrier frequency is received by the demodulator $SD_1$ and the resulting rectified current operates the relay $RL_1$. This completes a circuit through the winding of the relay $RL_4$, which is connected through a make contact of the relay $RL_1$, a make contact of the relay $RL_2$, and a back contact of the stepping magnet $RL_5$. The relay $RL_4$ through its make contact completes a circuit which energizes $RL_5$, and the operation of the stepping magnet $RL_5$ advances all wipers by one position.

The operation of the stepping magnet $RL_5$ also deenergizes the relay $RL_4$ which is connected through the back contact of $RL_5$. This in turn deenergizes $RL_5$. If at this time the switching unit is connected to an idle pair of channels, no further operation occurs and the subscriber is ready for communication with the central office. If, however, the connection has been made to another busy pair of channels, the relay $RL_4$ will operate as before, and the switching mechanism will be advanced another step, this operation being repeated until an idle pair of channels is found. The relay $RL_2$, being of the slow-release type, will not release during the channel selecting operation.

The selection of a pair of channels to the central office has served in addition to adjust the frequency of the subscriber's oscillator from the frequency normally used for answering incoming calls to the transmitting frequency corresponding to the outgoing channel selected. This adjustment is accomplished through the bank of contacts $s_7$ on the switching unit. The fixed condenser $FC_3$, which is connected across the plate winding of the oscillator coil, produces the frequency for answering incoming calls. The operation of the relay $RL_3$, however, connects the tapped condenser $TC_5$ across the plate winding instead, and the adjustment of this condenser is determined so that the frequency corresponds to that of the variable tuned circuits on each switching step.

Upon the completion of the channel selection the slow-release relay $RL_2$ releases, and this connects the carrier supply from the oscillator to the modulator through a back contact of $RL_2$. When the operator at the central office plugs in to answer the call, a carrier frequency will be transmitted into the demodulator, pulling up the relay $RL_1$. The relay $RL_4$ does not operate now, however, since it is connected through a make contact of the relay $RL_2$, and no further stepping can occur.

The subscriber passes his number to the operator, and when the connection is established the conversation may proceed. Should the subscriber desire to signal the operator, he may move his switchhook up and down, thereby interrupting his carrier frequency. In doing this, however, he should not open the switchhook connection long enough for the relay $RL_3$ to release, since this will break the connection. In case this feature is considered undesirable, the connection of the carrier supply through the switchhook may be replaced by a push-button contact with which the subscriber may flash the operator without disturbing the circuit of $RL_3$.

The operation of the arrangement of Fig. 9 in receiving an incoming call will now be described. When the subscriber's receiver is on the switchhook, relay RL3 is deenergized and the modulator and demodulator are connected through the back contacts of this relay to selecting circuits FF1 and FF2, which correspond to the pair of frequencies permanently assigned to the subscriber for incoming calls. The oscillator frequency is properly adjusted by the condenser FC3.

The rectified current produced by the incoming carrier frequency operates the relay RL1, closing the circuit of the bell SB, which is connected through one of the contacts of the switchhook. When the subscriber answers the call, the bell circuit is broken by the switchhook and the apparatus is in condition for conversation with the calling party.

It will be understood in connection with Fig. 9 that other switching or adjusting mechanisms might be employed for selecting an idle channel for use by the calling subscriber in reaching the central office.

It will also be understood that other types of variable selecting circuits and oscillator control schemes might be used in Fig. 9. Thus, for example, the tapped inductances and condensers of Fig. 9 might be replaced by a number of individual units of fixed inductance and capacity. An arrangement of this kind is described subsequently in connection with Fig. 12. Yet another possibility would be to use for the variable elements neither tapped units nor fixed individual units but continuously variable inductances and condensers whose value is controlled by the rotary switching mechanism in the manner indicated in the perspective drawing of Fig. 10. In this figure VC1 and VC2 designate variable condensers and VI1 a variable inductance, all of which are mounted on a shaft which is rotated by the stepping magnet RL5 as operated by the circuit arrangement of Fig. 9. These are connected to fixed inductances FI1 and FI2 and the fixed condenser FC1 to form a variable filter equivalent to the filter VF1 in Fig. 9. It will be understood that all of the variable inductances and condensers required might be either mounted on or connected to a common shaft, and that the banks of switch contacts shown in Fig. 9 would thereby be rendered unnecessary. It will be understood also that the adjustable or variable inductances and capacitances as described might be employed in other types of selecting circuits.

For the central office apparatus to be used in conjunction with the subscriber's apparatus of Fig. 9, the arrangement of Fig. 11 may be employed. Referring to Fig. 11, it will be seen that the apparatus at the left-hand side of the diagram including the cord circuit as far as the operator's set and splitting key is the same as that shown in Fig. 6 and Fig. 7. The operation of this part of the central office arrangement, which is used for the connection with the calling subscriber, will be evident without further explanation.

The right-hand side of Fig. 11 shows in schematic form the arrangement of apparatus for establishing connection with the called subscriber. It will be seen that in this case a modulator and demodulator OM2 and OD2 are permanently associated with the cord circuit through the hybrid coil OH2. The oscillator OO2 furnishes to the modulator a carrier supply whose frequency is controlled by the selecting mechanism SM. The modulator output is connected to a variable channel filter OF5 whose frequency of response may be adjusted by the selecting mechanism SM. Similarly the demodulator input is derived from the variable channel filter OF6 whose frequency is subject to adjustment by the selecting mechanism SM. The variable channel filters are connected respectively to the antennas OA5 and OA6.

In completing the connection to the called subscriber the operator inserts the plug OP2, which is associated with the cord circuit she has used in answering the call, in the jack OJ2 which corresponds to the number of the called party. This action places the code sending mechanism CS in connection with the selecting mechanism SM and causes a code of impulses corresponding to the number of the called subscriber to be transmitted to this mechanism. Under the guidance of this code the mechanism SM performs the following simultaneous functions: (1) adjustment of the carrier frequency delivered to the modulator to that frequency assigned to the called subscriber for the reception of incoming calls; (2) adjustment of the variable channel filter OF5 to pass the sidebands corresponding to the frequency of the cord circuit oscillator; (3) adjustment of the frequency of the variable channel filter OF6 to the transmitting frequency assigned to the called subscriber for use on incoming calls. In addition, if desired, the mechanism SM might be used to adjust the tuning of the antennas as is indicated by the dotted lines extending to OA5 and OA6.

Details of one possible arrangement whereby these various operations may be accomplished are illustrated in Fig. 12. The method of operation of the arrangement shown in this figure is as follows: Before placing the cord circuit plug OP2 in the jack OJ2 which corresponds to the number of the called party, the operator makes a busy test, using the circuit through the sleeve contact of the jack, the upper contact of the plug and thence through her key to the winding of an inductance coil which is bridged across her receiver. If the "line" is not busy, the plug is inserted, and the relay IR1 is thereby energized through the sleeve connection of the jack and plug. The make contact of this relay connects power supply to the motor DM which drives a wheel TW having a number of small teeth arranged in sets corresponding to the digits in the number of the called party, and having in addition a single large cam. The plug connection has served also to furnish battery to the initial relay FR of the selection mechanism SM. The rotation of the wheel TW interrupts this supply, thereby producing successive sets of "break impulses" in accordance with the digits of the subscriber's number.

When the wheel has gone through this code, the large cam completes a make contact which energizes the relay IR2 whose break contact interrupts the power supply to the motor. The relay IR2 locks itself up through the sleeve connection of the jack and plug so that the motor remains stationary while the connection is up. When the operator takes down the connection, the relay IR2 falls back and the mechanism is in readiness for a new connection.

Before tracing the operation of the selecting mechanism SM in response to the code which it receives, it may be pointed out that this mechanism comprises a number of relays associated with two selective switching units SW1 and SW2 each similar to the one already described in connection with the subscriber's apparatus in Fig. 9. In the present case, however, each unit comprises eight adjacent rows of contacts and eight double-ended wipers all responsive to a single stepping magnet. The stepping magnet $MR_1$ controls the operation of $SW_1$, while $MR_2$ controls the operation of $SW_2$. Each row of contacts in the switching units includes, in addition to ten "working" or "off-normal" contacts, a "normal" contact to which the wiper returns when the operator's connection is taken down.

A further feature provided in the switching unit $SW_1$ is a set of "off-normal" spring contacts ONS of the type familiar in the machine switching art. In the normal position of the switching unit $SW_1$, a lug on the shaft presses down on the "off-normal springs," closing the contacts on the lower sides. When the unit moves off normal, the pressure on the off-normal springs is released and the upper contacts are made.

The circuits controlling the operation of the switching units $SW_1$ and $SW_2$ will now be explained. Upon the establishment of the connection, the energizing of the relay FR closes a circuit which pulls up the slow release relay RR. The motor driven wheel now dials the first digit of the subscriber's number. Let us suppose, for example, that this number is 34. Then the circuit of relay FR will first be interrupted three times in fairly rapid succession. The deenergizing of the relay FR will break the circuit of the relay RR, but since the latter is a slow-release relay it will continue to hold until the relay FR pulls up again.

When the armature of the relay FR falls back at the first break it closes a circuit through its break contact, the make contact of RR, the contacts $c$ and $a$ on the off-normal springs, the winding of the slow release relay SR and the stepping magnet $MR_1$. Hence, the relay SR pulls up and at the same time the stepping magnet $MR_1$ operates to advance the wipers of the unit $SW_1$ by one step.

This circuit through the relay SR and the stepping magnet $MR_1$ is immediately broken by the reenergizing of the relay FR after the first "break impulse." The stepping magnet $MR_1$ releases, but since SR is a slow-release relay it holds until the next impulse. The second "break impulse" again deenergizes the relay FR and again closes a circuit through the relay SR and the stepping magnet $MR_1$. This time, however, the circuit is completed over a new path leading from ground over the back contact of the relay FR, the make contact of the relay RR, contacts $c$ and $b$ on the off-normal springs (closed when the switch $SW_1$ was advanced one step), the make contact of the relay SR and the stepping magnet $MR_1$. Thus the switch $SW_1$ is advanced another step. The third break impulse acts just as the second one did to advance the switch one more step.

After the third break impulse there will be a time interval before the dialing of the next digit so that the slow-release relay SR will be deenergized. This will break the circuit through this relay so that when the second set of impulses arrives, the stepping magnet $MR_1$ will be out of the circuit. The first break impulse of the second series causes the relay FR to fall back and thereby closes a circuit through the break contact of relay FR, the make contact of relay RR, off-normal contacts $c$ and $b$, the break contact of relay SR and thence through the winding of the stepping magnet $MR_2$. Thus the wipers of the switching unit $SW_2$ will all be advanced one position. The stepping magnet $MR_2$ will be deenergized at the end of the first break impulse and the following three impulses will act each to advance the switch $SW_2$ by one step just as the first one. Consequently, at the conclusion of the dialing, all the wipers of the switch $SW_1$ will be in position 3 and those of the switch $SW_2$ in position 4.

The connections of the various rows of contacts $s_1$, $s_2$, $s_3$, etc., of the switching units $SW_1$ and $SW_2$ will now be explained. Two variable band filters similar to those used in the subscriber's station arrangement of Fig. 9 are employed. Each band filter comprises a T network which includes in each series arm a fixed inductance and a capacity whose value depends upon the position of the wipers of the switching units $SW_1$ and $SW_2$. The shunt part of the T network comprises a fixed condenser connected in parallel with an inductance whose value is determined by the switch position. One side of the filter is connected through the switch contacts to the antenna, while the other is connected to the modulator or demodulator, as the case may be.

The fixed and the adjustable elements of each filter are so designed that when the switching units are in the appropriate position the transmitting and receiving channels of the called subscriber are selected. It will be seen also that the position of the switching units determines the frequency of the oscillator $OO_2$ through the selection of a capacity value by the contact row $s_7$.

Since frequency is ordinarily an inverse function of inductance and capacity, if the subscribers' frequencies are arranged in the same order as the switch positions (and call numbers), the values of capacity and inductance associated with the switching units should be arranged in an order of magnitude inverse to the switch position numbers. The steps of inductance and capacity on switching unit $SW_2$ should be approximately one-tenth of those on unit $SW_1$. If the capacity and inductance values differ by uniform intervals, the frequencies will evidently be separated by non-uniform intervals.

Certain further features of the arrangement of Fig. 12 will now be described. It will be recalled that the large lug on the toothed wheel TW closes a circuit through the relay $IR_2$ and thereby stops the dialing process. This relay $IR_2$ also closes a contact which energizes the relay OR. The relay OR, which remains energized as long as the connection is established, through its make contact connects the carrier supply from the oscillator $OO_2$ to the modultor $OM_2$.

When the connection is taken down the relay FR is deenergized and this in turn deenergizes the slow-release relay RR. At this time two circuits are closed to ground through the back contacts of relays RR and FR. One of these leads through the wiper of contact row $s_8$ of switching unit $SW_1$ to one of the off-normal contacts of this row and thence through a back contact of the stepping magnet $MR_1$ and the winding of this magnet. The other path leads similarly through the wiper of row $s_8$ of switching unit $SW_2$, an off-normal contact of this row, a back contact of the stepping magnet $MR_2$ and the winding of this magnet. These circuits cause the stepping magnets $MR_1$ and $MR_2$ to buzz around until the normal contact position of each is reached. Thus the switching units are placed in readiness for the next connection.

If desired, tapped inductances and condensers similar to those used in Fig. 9 might be employed in place of the individual condenser and inductance units associated with the switching steps in Fig. 12. Another possibility would be to derive the desired values of inductance and capacitance from variable condensers and inductances which might either be mounted directly on the shafts of the switching units or controlled by them. For this purpose the condensers and inductances to be controlled by the stepping magnet $MR_1$ may be mounted on a common shaft which is provided with a wiper traversing an annular ring. This is shown in the perspective drawing of Fig. 13. The condensers and inductances to be controlled by the stepping magnet $MR_2$ are similarly shown mounted on another shaft. The condensers and inductances controlled by $MR_1$ may have values approximately ten times those of the condensers and inductances controlled by $MR_2$. The corresponding units on the two shafts may be suitably connected together and to the proper place in the tuned circuit.

Referring to Fig. 13 in response to the stepping magnet $MR_1$ the shaft is stepped around to a position corresponding to the first digit of the desired number thus adjusting the values of the inductance $VI_1$ and the condenser $VC_1$. The first 180 degrees of rotation of the shaft covers the useful range of the circuit elements. Since these elements are continuously variable any number of positions may be included in this range. The number of teeth on the ratchet $RA_1$ should therefore be twice the number of positions employed. For ten digits the ratchet should have 20 teeth.

When the connection is taken down, a circuit is completed through the stepping magnet and its back contact, the wiper and annular ring, and the back contact of the release relay to ground. This completes the revolution of the shaft around to the starting point where an insulated segment breaks the circuit. The mechanism is now in readiness for the next operation.

It will be understood, of course, that other known types of tuned circuits may be employed in place of the single section band filters shown in Fig. 12.

It will be noted that the arrangement of Fig. 13 eliminates all mechanical contacts in the central office connection except those of the operator's plug.

While the arrangement of Fig. 12 is designated to care for a maximum of 99 subscribers, it will be evident that its capacity may be increased by methods familiar to those skilled in the automatic switching art.

An arrangement alternative to that of Fig. 12 and somewhat simpler is shown in Fig. 14. In this case fixed condensers, such as $IC_1$, $IC_2$, etc., and fixed inductances, such as $II_1$, etc., are associated with the jack $OJ_2$, representing the called party. When the operator inserts the cord circuit plug $OP_2$ into this jack, the inductances and condensers serve to adjust the oscillator frequency and the frequencies of the transmitting and receiving selecting circuits to the desired values. The same result might also be accomplished by providing the operator with keys corresponding to the called subscribers, and having her operate a key instead of inserting a plug in a jack.

In comparing the central office arrangement of Fig. 11 with that of Fig. 6, it will be evident that while there is more apparatus associated with the cord circuit in Fig. 11, the total amount of central office apparatus is very much less, since the number of cord circuits required will be only a small fraction of the total number of subscribers. On the other hand, the subscriber station arrangement of Fig. 9 is more complicated than that of Fig. 4, owing to the fact that an idle pair of channels is selected for the outgoing call.

Another scheme will now be described which may employ a subscriber station arrangement like that of Fig. 4 and a central office arrangement in which the apparatus individual to each subscriber is small. The central office arrangement for this scheme is illustrated in Fig. 15. In this case, a pair of channels is permanently assigned to each subscriber, one for transmitting and one for receiving. The central office is arranged so that a call coming in at any assigned frequency is automatically picked up and brought to the operator, who completes the connection to the called subscriber.

Referring to Fig. 15, the antenna $OA_0$ is designed to receive incoming carrier frequencies within a range corresponding to all of the subscribers assigned to the central office or to a group of subscribers. The received frequencies are delivered to the tuned circuit $OF_0$ whose frequency of response is being continuously varied by the driving motor $DM_0$. The same motor also rotates the switch $SW_0$ which is provided with a number of contacts, one for each subscriber whose incoming frequency may be selected by the selecting circuit $OF_0$. The switch is arranged so that the contact corresponding to any given subscriber is made at the same moment that the frequency of that subscriber is picked out by the selecting circuit.

The carrier frequency of an incoming call is selected momentarily by $OF_0$ and is rectified in the rectifier $OD_0$. The resultant current operates the relay $OR_0$, which closes a circuit through the winding of the slow-release relay $OR_1$, the back contact of the relay $OR_2$ and the switch $SW_0$. The operation of the relay $OR_1$ lights the subscriber's line lamp $OL_1$ thereby calling the attention of the operator to the incoming call. Similarly, as the selection and switching are being varied, the line lamps corresponding to other incoming calls will be lighted.

When the operator observes the lamp $OL_1$ she inserts a plug, for example, $OP_1$, which is associated with one end of a cord circuit, in the subscriber's jack $OJ_1$. This action completes a circuit through the relay $OR_2$, whose operation de-energizes the relay $OR_1$ and thus extinguishes the lamp $OL_1$. In addition, the insertion of the plug in the jack $OJ_1$ serves to adjust the response frequency of the variable selecting circuit $OF_1$ to the transmitting frequency of the calling subscriber, while at the same time the oscillator $OO_1$ and the selecting circuit $OF_2$ are brought to the receiving frequency assigned to the calling subscriber. This adjustment of the frequency of $OF_1$, $OF_2$ and $OO_1$ is accomplished by a frequency controlling mechanism $FC_1$ which may be similar to the arrangement illustrated in Fig. 12 or Fig. 14. The incoming carrier frequency of the calling subscriber is rectified in the demodulator $OD_1$ and operates the relay $OR_3$, thereby lighting the supervisory lamp $OL_2$ during the time when the calling subscriber's receiver is off the hook.

Having ascertained from the calling subscriber the number which is desired, the operator completes the connection by inserting the other cord circuit plug $OP_2$ in the jack $OJ_2$ which corresponds to the number of the called party. This action energizes the relay $OR_6$, thereby preventing the line lamp of the called subscriber from lighting when he answers the call. Also, the completion of the connection by means of the frequency adjusting device FC$_2$ serves to bring the frequencies of the oscillator OO$_2$ and the selecting circuits OF$_3$ and OF$_4$ to the frequency assignments of the called subscriber. The supervisory lamp OL$_3$ is lighted when the called subscriber answers, and remains lighted until he hangs up. The other features of the cord circuit in Fig. 15 being similar to those of previous figures which have already been described, no further explanation will be needed.

As noted, the selecting circuit OF$_0$ and the switch SW$_0$ might serve for all the subscribers assigned to the office, or these subscribers might be divided into groups, with one selecting circuit and switch taking care of each group, and all such circuits and switches driven by a common motor.

It is apparent that the arrangement of Fig. 15 permits the employment of a relatively simple arrangement at the subscriber's station, inasmuch as the frequencies used by the subscriber are always the same. The cord circuit arrangement at the central office is somewhat complicated, but the number of cord circuits required will be only a small fraction of the total number of subscribers.

When the arrangement of Fig. 15 is used in conjunction with the subscriber's station of Fig. 4, it provides an interconnection for subscribers which includes no switched contacts in the transmission path. Although the cord circuit of Fig. 15 comprises the plugs OP$_1$ and OP$_2$ and the subscribers' jacks such as OJ$_1$ and OJ$_2$, it is to be noted that these plugs and jacks do not form a part of the transmission path. The insertion of the plugs OP$_1$ and OP$_2$ in the subscribers' jacks serves to initiate the operation of mechanism which in turn tunes selecting circuits such as OF$_1$ and OF$_2$ to the required frequencies. The mechanism involved and the selecting circuits may be of the type illustrated in Fig. 12, supplemented by or modified by Fig. 13; under which circumstances there will be no switched contacts in the transmission path. It has already been pointed out how the apparatus of Fig. 4 could be modified so that it also includes no switched contacts in the transmission path.

Instead of saying that there are no switched contacts in the transmission path this feature may be described by saying that in so far as parts of that path are metallically conductive they are permanent in their structural material connectivity along the path, that is, any two consecutive structural elements of the path remain always consecutive in the same degree from one time to another time; or, stated a little differently, each pair of structural elements of the path remain in their normal consecutive relation at all times. The signaling path may be described as topologically invariant, using this expression in its technical but well established sense, which may be illustrated by remarking that a fish line in ordinary use for casting or otherwise, is all the time topologically invariant.

In addition to the several methods of frequency allocation which have been described in connection with Figs. 4 to 15, inclusive, various other schemes might be employed. One possibility, for example, might be to assign a number of carrier frequencies over which the subscriber might pass his own number to the central office.

Yet other arrangements might be devised which employ the principles which have already been disclosed but differ in detail from the arrangements described.

It will be evident that all of the arrangements described in connection with Fig. 4 to Fig. 15 are adaptable to modern manual switchboard practice, including the use of multiple switchboards, and that the lines may be multipled to "A" operators for answering incoming calls and to "B" operators for completing connections to called subscribers. Arrangements for making the "busy tests" required in such multiple operation have been described in connection with certain of the figures and may be similarly obtained in the others.

In the various arrangements shown in Figs. 2 to 15 radio transmission between the subscribers and the central office may be accomplished directly using any suitable type of antenna. However, in order to permit the use of ultra short waves, for which substantially line-of-sight projection may be desired, it may be necessary to carry the transmission path above any obstacles lying between the antennas of individual subscribers. For this purpose an arrangement of the type shown in Fig. 16 might be employed.

Referring to Fig. 16, it will be seen that in this case a single central office antenna OA serves for receiving all frequencies from subscribers and transmitting all frequencies to subscribers. This antenna may be mounted on a tall building or tower so that substantially a line-of-sight transmission path is obtained between the central office and each subscriber's antenna within the central office area. The subscriber's antenna should preferably be designed for radiating a beam toward the central office antenna and for receiving radiation from that antenna. Thus the subscriber's antenna might be a balanced doublet SA as shown in Fig. 16, placed near the focus of a parabolic reflecting surface PR, directed toward the central office antenna OA. The central office antenna, however, is designed for radiating to and receiving from all subscribers. For this purpose there might be employed an antenna capable of radiating in all directions and receiving radiations from all directions throughout the range of frequencies utilized. Such an antenna, for example, might be a balanced doublet OA as shown in Fig. 16. Another possibility would be to employ a central office antenna so designed that it is capable of radiating into and receiving from a conical space which comprehends all subscribers' locations. This might be accomplished by adding the reflector RE above the doublet antenna OA.

It is also contemplated that instead of employing a single central office antenna a multiple antenna arrangement might be used at the central office building, each antenna being designed for handling a part of the total range of frequencies. It would also be possible to employ two antennas for each subscriber instead of one.

The invention further contemplates that subscribers' stations of the types described above shall be located in different central office areas and interconnected both with one another and with other types of stations. This may be accomplished by a connection between each subscriber and his central office, using a frequency or frequencies assigned for that purpose, and completing the connection over suitable interoffice trunks. The method is illustrated schematically in Fig. 17. The central office apparatus to be used in carrying out this method might be patterned after that shown in previous figures, particularly Fig. 6, 11 or 15. The types of trunks which may be used to interconnect the central offices are well known in the art.

In the arrangements which have been described for selecting channels at subscriber stations and central offices, the entire selection has been accomplished at the channel frequency. It will be evident that this method of selection might be replaced by the well-known superheterodyne method, with partial selectivity provided at the channel frequency and the remaining selectivity furnished by a sharp, intermediate frequency selecting circuit or filter.

It will be evident to those skilled in the art that arrangements for automatically controlling the volume of the signals delivered by the subscriber's equipment may be incorporated in any of the subscriber's station arrangements which have been described, so that conversation between different subscribers may take place over a substantially constant transmission equivalent.

It will be noted that in all of the subscriber station arrangements described above, the apparatus is designed to prevent a subscriber from listening in on the conversations of other subscribers. This, of course, is a very desirable feature for a telephone exchange system.

In all of the arrangements thus far described it has been assumed that free space is employed as the common transmitting medium. There will now be described arrangements in which transmission over a high-frequency conducting or guiding path is employed instead of radio transmission. Such a path would take the form of a network extending to all subscribers within a given area and to the central office for that area.

Probably the simplest form of such a network would be one composed of ordinary two-conductor circuits suitably interconnected and branched so that the common circuit will be available at all desired points. The circuits composing the network might, for example, consist of pairs of open-wire or cable conductors. A network of this kind is shown schematically in Fig. 18, where each line represents a pair of conductors, C designates the central office and S a subscriber's station.

It is contemplated also in accordance with the invention that the wire network employed for distributing light and power currents might be used as the common medium from which to derive high-frequency channels for the telephone exchange system. The high-frequency channels would be superposed upon the power network by carrier methods which are well known in the art.

Another form of transmission medium, and one which is peculiarly advantageous in that it is capable of transmitting a wide band of frequencies with comparatively low attenuation and which may be so shielded as to be practically immune to external disturbances, may be found in a circuit consisting of two conductors disposed coaxially with respect to one another. Such a circuit has been disclosed in the patents to L. Espenschied and H. A. Affel, No. 1,835,031, December 8, 1931, H. A. Affel and E. I. Green, No. 1,731,092, November 11, 1930, etc. In this form of circuit, low attenuation at high frequencies may be obtained by the employment of conductors whose high-frequency resistance is suitably small and by the employment of a substantially gaseous dielectric. The outer conductor provides shielding against external disturbances, which shielding becomes more nearly perfect as the frequency is increased, so that at high frequencies the noise due to thermal agitation in the conductors becomes the factor which determines the minimum transmission level. A diagram of one form of coaxial circuit is given in Fig. 19, where 1 designates an outer cylindrical conductor and 2 a conducting wire or tube concentric therewith. The two conductors are maintained in proper spaced relationship by the insulating disks 3. The circuit is shown connected to apparatus 5.

As an alternative to the coaxial circuit, the high-frequency transmission medium might comprise a network of circuits, each consisting of two parallel conductors surrounded by a shield. Circuits of this type are disclosed in the patents to Green, Curtis and Mead, No. 2,034,032, Green and Curtis, No. 2,034,033, and Green and Leibe, No. 2,034,034, all granted March 17, 1936. One form of such a shielded pair is illustrated in Fig. 20, where 1 designates a conducting shield and 2 and 4 represent conductors located on opposite sides of and equidistant from the axis of the shield. These conductors are held in proper spaced relation to one another and the shield by means of insulating disks 3. The conductors 2 and 4 may be connected to apparatus 5. In a circuit of this type it is desirable to employ conductors of suitable size, with as far as possible gaseous insulation, in order to minimize the high-frequency resistance and capacitance and thereby reduce the high-frequency attenuation. The thickness of shield, moreover, should be such as to minimize external disturbances.

The invention contemplates also utilizing as the high-frequency transmission medium a dielectric wave guide comprising a cylindriform dielectric material which may or may not be surrounded by a conductor. Such dielectric guides are disclosed in the patent applications of G. C. Southworth, Serial No. 661,154, filed March 16, 1933, and Serial No. 701,711, filed December 9, 1933. An advantageous form of such a wave guide is a hollow cylindrical conductor containing air or some other gas as the dielectric. This type of circuit is particularly adapted to transmit waves of very high frequencies, for example, of the order of a few centimeters or less in wave length. Fig. 21 shows one form of such a wave guide. Apparatus 5 produces high-frequency signaling currents which are propagated along the coaxial circuit comprising the tube 1 and the conductor 2, separated from one another by insulating disks 3, as shown in the cut-away portion of the tube. If the frequency is sufficiently high, the conductor 2 need continue only a short distance inside the tube 1, and the electromagnetic waves from the apparatus 5 travel along conductors 1 and 2 and will continue along the tube 1 where the inner conductor has been removed, transmission taking place on the inner surface of the tube and the enclosed dielectric. A similar device may be used at the other end of the dielectric wave guide to receive the signals.

It is contemplated in accordance with the invention that any of the subscriber set and central office arrangements which have been described may be employed with any of the above types of transmission paths. For this purpose, it is necessary merely to substitute the transmission network for the radio path, replacing the connection of the apparatus to the radio antenna by a connection suitable to the type of medium employed. Thus, for example, Fig. 22 illustrates how the arrangement of Fig. 4 might be adapted to use a coaxial circuit network as the transmission medium. As shown, the inner conductor 2 of the coaxial circuit is connected to the selecting circuits SF₁ and SF₂ while the outer conductor 1 may be expanded to form a shield around part or all of the apparatus.

When using a network such as that of Fig. 18 for a system in which connections are established through the central office, there might be some advantage in so allocating the frequencies that the outermost subscribers utilize the lower frequencies for which the attenuations are smaller, while the close-in subscribers utilize higher frequencies which undergo higher attenuations.

Fig. 23 shows an arrangement wherein coaxial lines extend in several directions from the central point. Each line is terminated in a resistance RT which approximates its characteristic impedance. At the central point each of the inner conductors of the various branches is brought through a resistance JR to a common junction point. The function of the resistance JR is to avoid high-frequency reflections which otherwise would be produced at the junction. The hybrid coil HB is shown connected to the common junction through a resistance JR, though it would be possible to omit this resistance if a suitable value were assigned to the others. The opposite side of the hybrid is terminated in a resistance BR which is equal to JR plus the parallel impedance of all the branches. The various transmissions arriving at the central point may be amplified by the amplifier AM before interconnections.

The arrangement of Fig. 23 may be employed with the subscriber station arrangements hereinbefore described in which different carrier frequencies are employed for opposite directions of transmission. The central office apparatus for communication with subscribers is shown at CA in Fig. 23. In case amplification at the central station is not required, the apparatus CA may be connected direct to the line junction.

There will now be considered some of the schemes which may be followed in disposing the network which forms the common transmission medium so that it will be available to the subscribers in a given area as well as to the central station. If the subscribers are located in an urban district, the development of the buildings and streets will very likely be in the form of more or less rectangular blocks. Preferably the network should conform to this plan.

Perhaps the simplest scheme for this purpose is to arrange the network in the form of a grid as illustrated schematically in Fig. 24. In this figure each line represents a conducting circuit or guide (for example, a coaxial circuit), the various circuits being connected together at points indicated by the dots. The equipment of each subscriber may be connected to the nearest point of the grid through a high impedance, as shown, for example, in Fig. 23. The central station apparatus CS is connected to the grid somewhere near its center.

One possible difficulty in the arrangement of Fig. 24 may arise from the large number of points of junction or branching which it contains. Each of these points represents a source of transmission loss due to the division of energy between the branches, and also, unless the junction points are specially treated, a source of high-frequency reflections which may be produced by the improper termination which the junction may offer to each circuit entering it. A further difficulty may arise due to the fact that between any two points of the grid there are several paths over which transmission may take place, so that the relative phases of the signals arriving over the different paths may result in very inefficient transmission for particular frequencies between particular points.

Another type of network arrangement is shown in Fig. 25. Here a single transmission circuit is provided which extends outwardly from the central station in what may be termed a "square spiral," the circuit being terminated at its outer end in a resistance RT which is substantially equal to its high-frequency characteristic impedance. Again, each subscriber may be connected to the nearest point of the network, the length of such connection, however, being on the average somewhat greater than for Fig. 24. It will be evident that the scheme of Fig. 25 eliminates the points of branching which appeared in Fig. 24 and that the total network mileage has been reduced.

Yet another possible arrangement is shown in Fig. 26, this arrangement being similar to the grid of Fig. 24 but having fewer points of branching. The ends of the various circuits may be terminated in resistances RT as in Fig. 24. It would evidently be possible by bringing the various paths back to the central point to obtain a scheme having only a single junction point rather than the multiple junctions as shown.

Another type of network arrangement is shown in Fig. 27, the circuits being arranged in the form of main feeders extending outwardly from the central station and branch feeders extending at various points from the main feeders.

While the entire preceding discussion has been restricted to systems wherein a common transmission medium is employed for the provision of telephone exchange service between subscribers, it will be understood that the invention contemplates the use of the same general methods for other types of communication. In particular, it will be seen that there has been disclosed a medium which is capable of handling a wide band of frequencies from which a substantial number of television channels may be derived.

It will furthermore be obvious that the general principles herein disclosed may be embodied in many other organizations widely different from those illustrated without departing from the spirit of the invention as defined in the following claims.

What is claimed is:

1. In a system for the simultaneous transmission of intelligence between any one and any other of a plurality of subscribers' stations taken in pairs, the method which consists in making provision at each subscriber's station for transmitting at a fixed carrier frequency and receiving at a different fixed carrier frequency, the transmitting frequencies of all subscribers' stations being located in one part of the frequency spectrum and the receiving frequencies of all subscribers' stations in another part of the frequency spectrum, and the transmitting and receiving frequencies of each station being different from the corresponding frequencies of other stations.

2. In a system for the simultaneous transmission of intelligence between any one and any other of a plurality of subscribers' stations taken in pairs, the method which consists in making provision at each subscriber's station for transmitting at a fixed carrier frequency and receiving at a different fixed carrier frequency, the difference between the transmitting and receiving frequencies being the same in magnitude and sign, and the transmitting frequencies at all subscribers' stations being located in one part of the frequency spectrum and the receiving frequencies of all subscribers' stations in another part of the frequency spectrum, and the transmitting and receiving frequencies of each station being different from the corresponding frequencies of other stations.

3. In a system for the communication of intelligence, a transmission medium extending to a plurality of subscribers' stations and to a central office, means at each subscribers' station for transmitting to said medium signals modulated upon a preassigned carrier frequency and for receiving from said medium signals modulated upon a second preassigned carrier frequency, the difference between the transmitting and receiving frequencies being the same in magnitude and sign for all subscribers' stations, and the transmitting and receiving frequencies of each station being different from the corresponding frequencies of other stations, and means at the central office whereby the signals transmitted from any subscriber's station may be received, converted to a different carrier frequency position, transmitted to any other subscriber's station and received at such other station only, and whereby a plurality of such interchanges may be carried out simultaneously.

4. In a system for the communication of intelligence, a transmission medium extending to all subscribers' stations and to a central office, means at each subscriber's station for transmitting to said medium signals modulated upon a preassigned carrier frequency and for receiving from said medium signals modulated upon a second preassigned carrier frequency, the transmitting frequencies of all subscribers' stations being located in one part of the frequency spectrum and the receiving frequencies of all subscribers' stations in another part of the frequency spectrum, and the transmitting and receiving frequencies of each station being different from the corresponding frequencies of other stations, and means at the central station whereby the signals transmitted from any subscriber's station may be received, converted to a different carrier frequency position, transmitted to any other subscriber's station and received at such other station only, and whereby a plurality of such interchanges may be carried out simultaneously.

5. In a system for the communication of intelligence, a transmission medium extending to a plurality of subscribers' stations and to a central office, means at each subscriber's station for transmitting to said medium signals modulated upon a preassigned carrier frequency and for receiving from said medium signals modulated upon a second preassigned carrier frequency, the difference between the transmitting and receiving frequencies being the same in magnitude and sign for all subscribers' stations, the transmitting frequencies of all subscribers' stations being located in one part of the frequency spectrum and the receiving frequencies of all subscribers' stations in another part of the frequency spectrum, and the transmitting and receiving frequencies of each station being different from the corresponding frequencies of other stations, and means at the central office whereby the signals transmitted from any one subscriber's station may be received, translated to a different carrier frequency position, transmitted to any other subscriber's station and received at such other station only, and whereby a plurality of such interchanges may be carried out simultaneously.

6. In a system for the simultaneous exchange of intelligence between any one and any other of a plurality of subscribers' stations taken in pairs, a transmission medium extending to all of said subscribers' stations, and means at each subscriber's station for transmitting to said medium signals modulated upon a preassigned carrier frequency, and for receiving from said medium signals modulated upon a second preassigned carrier frequency, the difference between the transmitting and receiving frequencies being the same in magnitude and sign for all subscribers' stations, the transmitting frequencies of all subscribers' stations being located in one part of the frequency spectrum and the receiving frequencies of all subscribers' stations in another part of the frequency spectrum, and the transmitting and receiving frequencies of each station being different from the corresponding frequencies of other stations.

7. In a radio telephone system including a plurality of subscribers' stations and a central office, means at each subscriber's station for transmitting signals modulated upon a preassigned carrier frequency and for receiving signals modulated upon a second preassigned carrier frequency, the transmitting frequencies of all subscribers' stations being located in one part of the frequency spectrum and the receiving frequencies of all subscribers' stations in another part of the frequency spectrum, and the transmitting and receiving frequencies of each station being different from the corresponding frequencies of other stations, and means at the central office whereby the signals received from any subscriber's station may be received, translated to a different carrier frequency position, transmitted to any other subscriber's station and received at such other station only, and whereby a plurality of such interchanges may be carried out simultaneously, including an antenna for receiving the transmissions from all of the subscribers' stations and a second and different antenna for transmitting to all subscribers' stations.

8. In a system whereby a plurality of telephone communications may be simultaneously effected over a common transmission medium and through a central office between any one and any other of a plurality of subscribers' stations taken in pairs, means at each subscriber's station for transmitting signals modulated on a fixed carrier frequency and receiving signals modulated on a different fixed carrier frequency, means at the central office for automatically indicating transmission from any one of said subscribers' stations which is calling, a cord circuit at the central office including two sets of transmitting and receiving apparatus, one set being assignable to answer the call of any particular station which is calling, and the other set being assignable to establish a call to any called station, means to automatically adjust one set of transmitting and receiving apparatus to the frequencies of a calling subscriber's station in response to the assignment of said set to answer a particular calling station, and means for automatically adjusting the second of said sets of transmitting and receiving apparatus to the frequencies of a called subscriber's station in response to the assignment of said second set to establish a call to the called station.

9. In a system whereby a plurality of telephone communications may be simultaneously effected over a common transmission medium and through a central office between any one and any other of a plurality of subscribers' stations taken in pairs, means at each subscriber's station for transmitting signals modulated on a fixed carrier frequency and receiving signals modulated on a different fixed carrier frequency, means at the central office for automatically indicating transmission from any one of said subscribers' stations which is calling, a plurality of connecting circuits at the central office, each of said connecting circuits including two sets of variable frequency transmitting and receiving apparatus, one set being assignable to answer the call of any particular station which is calling and the other set being assignable to establish a call to any called station, controlling means, responsive to the action by an operator in assigning one set of transmitting and receiving apparatus to answer a particular calling station, for automatically adjusting said set of transmitting and receiving apparatus to the frequencies of said calling subscriber's station, and controlling means, responsive to action by an operator in assigning the second set of transmitting and receiving apparatus to establish a call to a called subscriber's station, for automatically adjusting said second set of transmitting and receiving apparatus to the frequencies of said called subscriber's station.

10. In combination, more than two signaling stations and a central station all adapted to put any signaling station in two-way communication with any other signaling station to the exclusion of the remaining stations through said central station and through a medium common to all of the stations, the signaling channel between any two stations when established having its material parts structurally continuous and in so far as they are conductive, the conductive parts being of invariable continuity, the signaling channel between any two stations also operating on frequencies different from those employed by any other pair of stations in communication.

11. A plurality of signaling stations greater than two, a signaling path enabling any station to be put into two-way communication with any other station to the exclusion of the remaining stations, and means for adjustment of said path selectively to a wave frequency whereby communication may take place between two stations exclusively, said path comprising a part at least in which the signaling impulses are transmitted by electron flow, all such parts in the path being topologically invariant for such adjustments.

12. A plurality of signaling stations greater than two, a signaling path enabling any station to be put into two-way communication with any other station to the exclusion of the remaining stations, and means for adjustment of said path selectively to a wave frequency whereby communication may take place between two stations exclusively, said path comprising a part at least which is metallically conductive, all such parts being topologically invariant for such adjustments.

13. A plurality of signaling stations greater than two, a signaling path enabling any station to be put into two-way communication with any other station to the exclusion of the remaining stations, and means to adjust said path selectively to a wave frequency whereby communication may take place between two stations exclusively, said path comprising a part at least in which the signaling impulses are transmitted by electron flow, any two consecutive structural elements in all such parts being always consecutive in the same degree at all times along said path.

14. A plurality of signaling stations greater than two, a central station providing a path enabling any one of said signaling stations to be put into two-way communication with any other station to the exclusion of the remaining stations, and means to adjust such path through the central station to a frequency whereby communication may take place between two stations exclusively, the part of the path through the central station being adapted to transmit the signal impulses by electron flow therein, this part of the path being at all times topologically invariant.

15. A plurality of signaling stations greater than two, a central station providing a path enabling any one of said signaling stations to be put into two-way communication with any other station to the exclusion of the remaining stations, means to adjust such path through the central station to a certain frequency in and a certain frequency out whereby communication may take place between two stations exclusively, and means to shift the frequency between the in and out parts of the path, the path through the station being at all times topologically invariant.

LLOYD ESPENSCHIED.
ESTILL I. GREEN.